(No Model.)

H. TAYLOR.
MILK CAN.

No. 324,611. Patented Aug. 18, 1885.

WITNESSES:
Harry Frease.
L. C. Abbie

INVENTOR
Hiram Taylor
BY
Paul W. Bond
ATTORNEY

UNITED STATES PATENT OFFICE.

HIRAM TAYLOR, OF SALEM, OHIO, ASSIGNOR OF ONE-HALF TO JOHN HECKART, OF SAME PLACE.

MILK-CAN.

SPECIFICATION forming part of Letters Patent No. 324,611, dated August 18, 1885.

Application filed March 27, 1885. (No model.)

*To all whom it may concern:*

Be it known that I, HIRAM TAYLOR, a citizen of the United States, residing at Salem, in the county of Columbiana and State of Ohio, have invented certain new and useful Improvements in Milk-Cans; and I do hereby declare that the following is a full, clear, and exact description of the same, reference being had to the annexed drawings, making a part of this specification, and to the letters and figures of reference marked thereon, in which—

Figure 1:
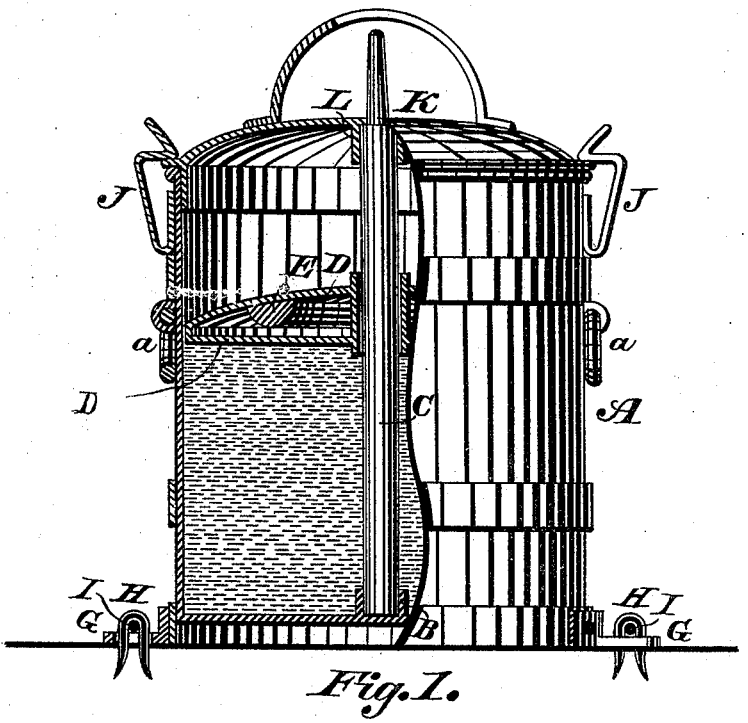
Figure 2:
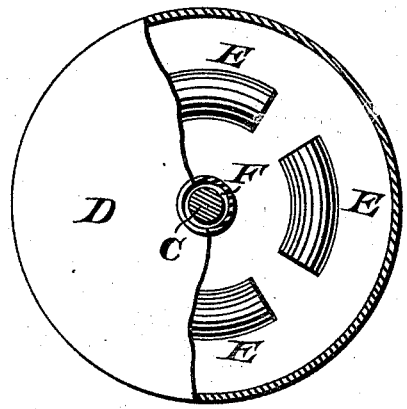
Figure 3:
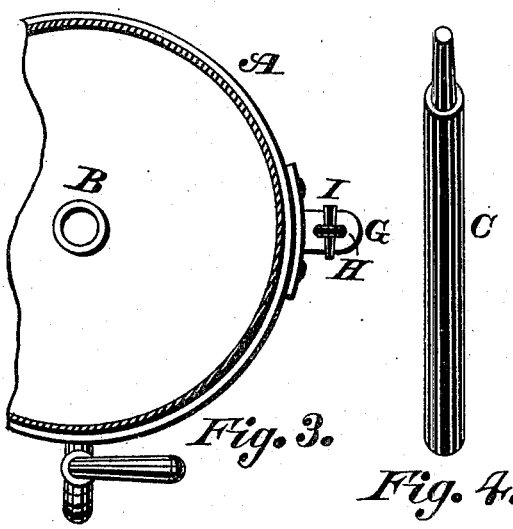
Figure 4:

Figure 1 is a side elevation showing a portion of the can in section. Fig. 2 is an under side view of float, showing a part of the bottom broken away. Fig. 3 is a top view of the bottom of the can. Fig. 4 is a detached view of float-guide.

The present invention has relation to that class of milk-cans designed to be used in the transportation of milk; and its nature consists in the different parts and combination of parts hereinafter described, and particularly pointed out in the claims.

In the accompanying drawings, A represents the can, which is substantially of the form shown in Fig. 1, and is provided with a suitable number of strengthening bands or hoops, the bottom of said can being attached in the ordinary manner.

To the sides of the can are attached the handles *a*, which may be of the form shown in Fig. 1, or they may be of any other desired form.

To the bottom of the can is attached the thimble B, which is for the purpose of holding the bottom or lower end of the guide C, said guide being substantially of the form shown in the drawings.

The float D is substantially of the form shown in Figs. 1 and 2, and is arranged so as to fit the inside of the can; and, as shown, is composed of two pieces or plates, the top or upper plate being curved, so as to form an air-chamber within said float.

To the top or upper plate are attached the weights E. Said weights may be made of lead or any other suitable material, and may be formed as shown in Fig. 2, or may be a ring, as desired. The center of the float is provided with an opening, F, which forms a passage for the guide C, and is so arranged that the float D will be locked on the guide C, when said float is thrown out of a plane perpendicular to the guide C, thereby preventing said float from being raised by the splashing of the milk. It will be seen that by providing an air-chamber in the float D I am enabled to weight said float, so that it will press on the top of the milk or other liquid sufficiently to keep the same from splashing under ordinary circumstances, and by locking the float D on the guide C, I am enabled to prevent the liquid from splashing at all times and under all circumstances, thereby preventing the milk from being injured by splashing.

To the bottom or lower end of the can are attached the ears or arms G, which are substantially of the form shown in the drawings, and are provided with openings for the passage of the staples H, said staples being securely attached to the bottom of the vehicle, and the can held in proper position by means of the ears or arms G, the staples H, and the pins I.

The top or upper end of the can A is provided with the spring-catches J, said catches being securely attached to the can by rivets or otherwise, the top ends of said catches being bent so as to extend over the top of the cover K, as shown in Fig. 1.

The cover K is provided with the thimble L, and is for the purpose of holding the top or upper end of the guide C in proper position.

The top or upper end of the guide C is made small, so as to more easily enter the thimble L in placing the cover K on the can A.

Having now fully described my invention, what I claim as new, and desire to secure by Letters Patent, is—

1. The float D, provided with the weight E, and having an air-chamber, substantially as and for the purpose specified.

2. The guide C, held in proper position by the thimbles B and L, in combination with the float D and the can A, substantially as and for the purpose specified.

3. The combination of the can A, provided with the ears or arms G, of the staple H and the pins I, all arranged substantially as described, and for the purpose specified.

In testimony that I claim the above I have hereunto subscribed my name in the presence of two witnesses.

HIRAM TAYLOR.

Witnesses:
　ELLA C. UNCAPHES,
　W. W. HOLE.